US012783546B2

(12) United States Patent
Gorantla et al.

(10) Patent No.: US 12,783,546 B2
(45) Date of Patent: Nov. 3, 2026

(54) AUTOMATED REPLICATION AND RECONCILIATION OF SOURCE DATA FROM AN ON-PREMISES DATABASE INTO A CLOUD DATABASE

(71) Applicant: FMR LLC, Boston, MA (US)

(72) Inventors: Bhaskara Gorantla, Flower Mound, TX (US); Nanda Kumar Subramani, Frisco, TX (US); Gopinath Narasimhan, Morrisville, NC (US); Nirmal Kumar Gandi, Cary, NC (US); Sriram Margapuri, Raleigh, NC (US); Sravya Vemparala, Ashburn, VA (US); Dhruv Naik, San Antonio, TX (US); Ashwin Veeravalli Gopalakrishnan, Chennai (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 19/217,177

(22) Filed: May 23, 2025

(65) Prior Publication Data

US 2026/0161663 A1 Jun. 11, 2026

Related U.S. Application Data

(60) Provisional application No. 63/728,829, filed on Dec. 6, 2024.

(51) Int. Cl.

*G06F 16/00* (2019.01)
*G06F 16/21* (2019.01)
*G06F 16/27* (2019.01)

(52) U.S. Cl.

CPC .......... *G06F 16/273* (2019.01); *G06F 16/214* (2019.01)

(58) Field of Classification Search

CPC ............................. G06F 16/273; G06F 16/214
See application file for complete search history.

(56) References Cited

U.S. PATENT DOCUMENTS

| | | | | |
|---|---|---|---|---|
| 2018/0150528 | A1 * | 5/2018 | Shah | G06F 16/254 |
| 2024/0250869 | A1 * | 7/2024 | Krawczyk | H04L 41/0803 |
| 2026/0010403 | A1 * | 1/2026 | Fahlbusch | G06F 9/5022 |

* cited by examiner

*Primary Examiner* — Paul Kim

(74) *Attorney, Agent, or Firm* — Cesari and McKenna, LLP

(57) ABSTRACT

Automated replication and reconciliation of source data from an on-premises database into a cloud database includes identifying a source database schema for replication to a target cloud database, defining a target database schema that corresponds to the source database schema, capturing data streams containing source data from the identified source database schema, transforming the source data into a form compatible with the target cloud database, storing the transformed source data in the target cloud database, publishing replication health metrics, allowing applications in the cloud computing environment to consume the transformed source data when the replication health metrics satisfy performance criteria, and reconciling the transformed source data in the target cloud database with the source data in the source database.

26 Claims, 6 Drawing Sheets

100

200

300

500

```
{
    "applyLatencyThreshold": true,
    "OverrideHealthStatus": false,
    "primaryRegion": "us-east-1",
    "latencyThreshold": [
        {
            "timeWindow": {
                "from": "0830",
                "to": "1700"
            },
            "thresholdInMS": "60000"
        },
        {
            "timeWindow": {
                "from": "1701",
                "to": "2200"
            },
            "thresholdInMS": "60000"
        },
        {
            "timeWindow": {
                "from": "2201",
                "to": "2359"
            },
            "thresholdInMS": "60000"
        },
        {
            "timeWindow": {
                "from": "0000",
                "to": "0829"
            },
            "thresholdInMS": "60000"
        }
    ],
    "defaultLatencyInMS": "60000"
}
```

FIG. 5

AUTOMATED REPLICATION AND RECONCILIATION OF SOURCE DATA FROM AN ON-PREMISES DATABASE INTO A CLOUD DATABASE

RELATED APPLICATION(S)

This application claims priority to U.S. Provisional Patent Application No. 63/728,829, filed on Dec. 6, 2024, the entirety of which is incorporated herein by reference.

TECHNICAL FIELD

This application relates generally to methods and apparatuses, including computer program products, for automated replication and reconciliation of source data from an on-premises database into a cloud database.

BACKGROUND

Due to the scalability, speed, and distributed availability of cloud computing environments, many medium and large enterprises have begun migrating their application and data resources from on-premises computing ecosystems to the cloud. However, a persistent challenge is the replication of legacy databases to the cloud—often, existing legacy databases are still actively being used for production software applications, so a simple data migration is not feasible. Replicating data from source database locations into cloud-based databases is a time-consuming process that may be highly susceptible to interface incompatibilities, transfer errors and other inconsistencies (e.g., data transformation and data type conversion mismatches), which results in a significant negative impact on the availability and accuracy of production software applications accessing the data.

SUMMARY

Therefore, what is needed are methods and systems that enable automated replication and reconciliation of source data from an on-premises database into a cloud database. The techniques described herein advantageously provide a reusable, resilient data replication framework with advanced validation, transformation, and latency/health monitoring features. Additionally, the methods and systems include self-healing and recovery mechanisms to ensure continuous data availability while guaranteeing data integrity with minimal development effort, resulting in accelerated modernization efforts. The comprehensive data replication process described herein plays a crucial role in supporting uninterrupted computing system and application software operation by promoting data accessibility, consistency, and integrity across disparate systems. In addition, streamlining data management processes helps reduce cost and time to market, enabling organizations to harness the power of data analytics, derive actionable insights, and drive innovation. These methods and systems provide the flexibility to connect to multiple data sources with minimal effort. In addition, the data replication solution described herein facilitates seamless integration and synchronization across heterogenous environments with a suite of advanced data analysis features.

The invention, in one aspect, features a system for automated replication and reconciliation of source data from an on-premises database into a cloud database. The system includes a server computing device having a memory for storing computer-executable instructions and a processor that executes the computer-executable instructions. The server computing device identifies a source database schema from a source database in an on-premises computing environment for replication to a target cloud database in a cloud computing environment, the source database schema comprising one or more data structures containing source data. The server computing device defines a target database schema comprising one or more data structures in the target cloud database that correspond to the data structures in the source database schema. The server computing device captures, from a transaction message platform, one or more data streams comprising messages containing the source data from the identified database schema. The server computing device transforms the source data from the data stream messages into a form compatible with the target cloud database. The server computing device stores the transformed source data in one or more data structures in the target cloud database. The server computing device publishes one or more replication health metrics for consumption by a replication monitoring system. The server computing device allows one or more applications in the cloud computing environment to consume the transformed source data from the target cloud database when the replication health metrics satisfy one or more performance criteria. The server computing device reconciles the transformed source data in the target cloud database with the source data in the source database.

The invention, in another aspect, features a computerized method of automated replication and reconciliation of source data from an on-premises database into a cloud database. A server computing device identifies a source database schema from a source database in an on-premises computing environment for replication to a target cloud database in a cloud computing environment, the source database schema comprising one or more data structures containing source data. The server computing device defines a target database schema comprising one or more data structures in the target cloud database that correspond to the data structures in the source database schema. The server computing device captures, from a transaction message platform, one or more data streams comprising messages containing the source data from the identified database schema. The server computing device transforms the source data from the data stream messages into a form compatible with the target cloud database. The server computing device stores the transformed source data in one or more data structures in the target cloud database. The server computing device publishes one or more replication health metrics for consumption by a replication monitoring system. The server computing device allows one or more applications in the cloud computing environment to consume the transformed source data from the target cloud database when the replication health metrics satisfy one or more performance criteria. The server computing device reconciles the transformed source data in the target cloud database with the source data in the source database.

Any of the above aspects can include one or more of the following features. In some embodiments, the source database is hosted by a mainframe computing system in the on-premises computing environment. In some embodiments, each of the one or more data streams in the transaction message platform is associated with source data for a different application workflow. In some embodiments, the server computing device captures messages from a plurality of the data streams in parallel.

In some embodiments, transforming the source data from the data stream messages into a form compatible with the target cloud database comprises converting a data type of one or more data elements in the source data to match a target data type acceptable by the target cloud database. In some embodiments, the server computing device validates the transformed source data prior to storage in the target cloud database.

In some embodiments, the replication health metrics include one or more of a replication latency, a replication data error count, and a replication connection error count. In some embodiments, the server computing device determines the replication latency by comparing a timestamp associated with the source data from the source database to a timestamp associated with corresponding transformed source data stored in the cloud database. In some embodiments, the server computing device prevents one or more applications in the cloud computing environment from consuming the transformed source data from the target cloud database when the replication latency is greater than a maximum latency threshold.

In some embodiments, reconciling the transformed source data in the target cloud database with the source data in the source database comprises extracting one or more data elements from the source data, extracting one or more data elements from the transformed source data that correspond to the data elements from the source data, and comparing the extracted data elements from the source data to the extracted data elements from the transformed source data to identify one or more discrepancies including: (i) one or more data elements in the source data that are missing in the transformed source data; (ii) one or more data elements in the transformed source data that are missing in the source data; and (iii) one or more data elements in the source data that do not match the corresponding data elements in the transformed source data. In some embodiments, the server computing device transmits a notification message to a remote computing system upon identifying one or more discrepancies. In some embodiments, the server computing device updates one or more data elements in the source data to correct the one or more discrepancies. In some embodiments, the server computing device updates one or more data elements in the transformed source data to correct the one or more discrepancies.

In some embodiments, the server computing device generates connection parameters for the target cloud database when defining the target database schema.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is a diagram of an excerpt of exemplary configuration data for a data replication process.

DETAILED DESCRIPTION

Figure 1:
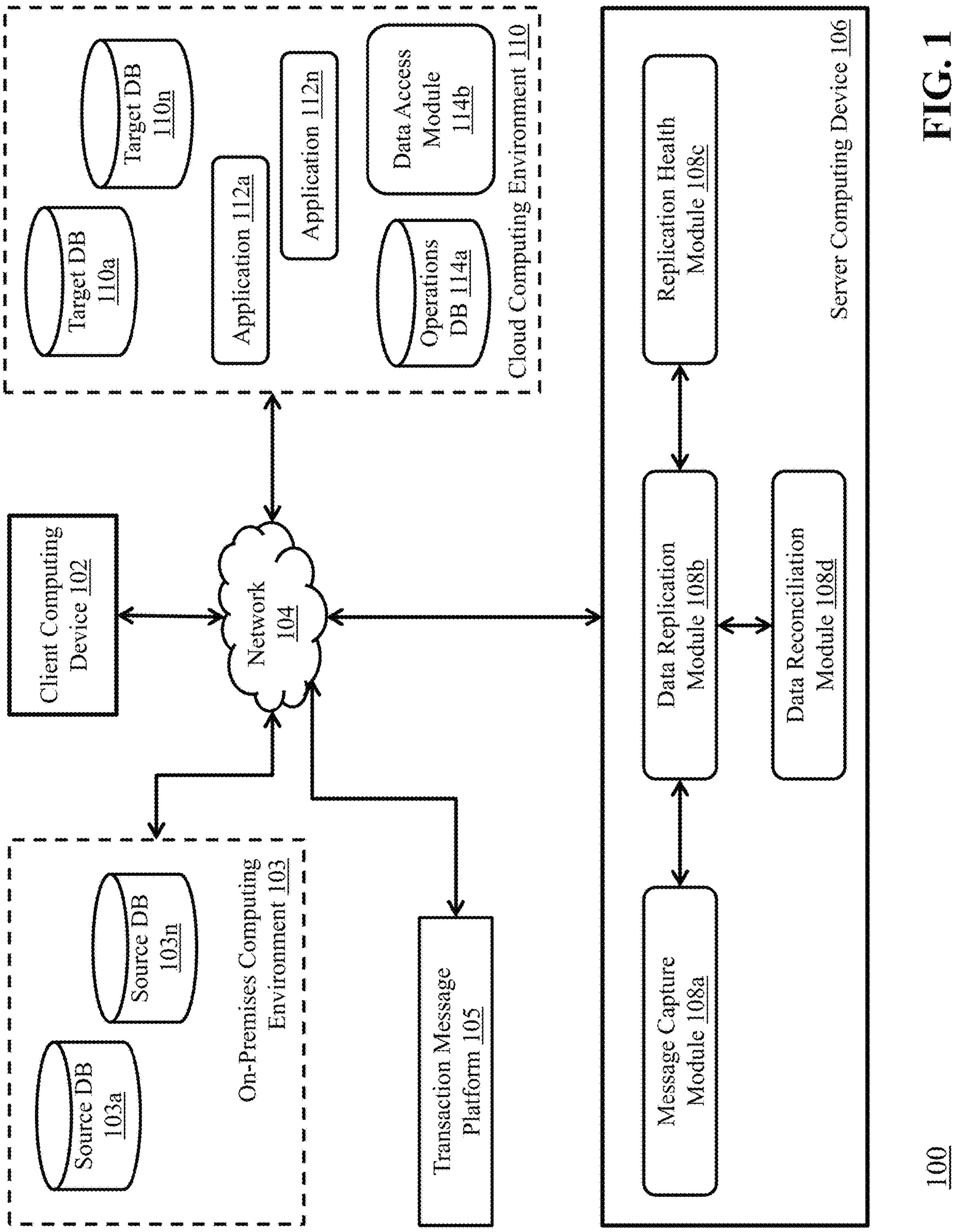
FIG. 1 is a block diagram of a system for automated replication and reconciliation of source data from an on-premises database into a cloud database.

FIG. 1 is a block diagram of system 100 for automated replication and reconciliation of source data from an on-premises database into a cloud database. System 100 includes client computing device 102, on-premises computing environment 103 including a plurality of source databases (DBs) 103*a*-103*n*, communication network 104, transaction messaging platform 105, server computing device 106 including message capture module 108*a*, data replication module 108*b*, replication health module 108*c*, and data reconciliation module 108*d*, and cloud computing environment 110 including a plurality of target databases 110*a*-110*n*, a plurality of software applications 112*a*-112*n*, operations database 114*a*, and data access module 114*b*.

Client computing device 102 connects to one or more communications networks (e.g., network 104) in order to communicate with server computing device 106 to provide input and receive output relating to automated replication and reconciliation of source data from an on-premises database into a cloud database as described herein. Exemplary client computing devices 102 include but are not limited to server computing devices, desktop computers, laptop computers, tablets, mobile devices, smartphones, and the like. It should be appreciated that other types of client computing devices that are capable of connecting to the components of system 100 can be used without departing from the scope of the technology described herein. Although FIG. 1 depicts one client computing device 102, it should be appreciated that system 100 can include any number of client computing devices. In some embodiments, client computing device 102 is configured with one or more applications that execute on client computing device 102 to provide certain functionality to an end user. In some embodiments, client computing device 102 can include a native application installed locally on client computing device 102. For example, a native application is a software application (also called an 'app') that written with programmatic code designed to interact with an operating system that is native to client computing device 102 and provide information and application functionality to a user of client computing device 102. In some embodiments, client computing device 102 can include a browser application that runs on client computing device 102 and connects to one or more other computing devices (e.g., server computing device 106) for retrieval and display of information and application functionality (such as initiating and/or monitoring a data replication and/or reconciliation process as described herein). In one example, the browser application enables client computing device 102 to communicate via HTTP or HTTPS with server computing device 106 (e.g., via a URL) to receive content for rendering in the browser application and presentation on a display device coupled to client computing device 102. Exemplary browser application software includes, but is not limited to, Firefox™, Chrome™, Safari™, and other similar software. The content can comprise visual and audio content for display to and interaction with a user.

On-premises computing environment 103 is a combination of hardware, including one or more special-purpose processors and one or more physical memory modules, and specialized application software that are executed by processor(s) of one or more computing devices in on-premises environment 103. Typically, on-premises computing environment 103 corresponds to the physical computing infrastructure of an organization or enterprise, often including legacy hardware such as mainframe computing devices. Source databases 103*a*-103*n* comprise data storage hardware and/or software applications (e.g., database platforms, data warehouses, or other types of data repositories) that store data associated with one or more enterprises and/or applications. In some embodiments, source databases 103*a*-103*n* are comprised of one or more database source types residing on a plurality of distributed computing systems. Exemplary source databases 103*a*-103*n* can include but are not limited to relational databases such as DB2™ from IBM Corp., messaging-oriented middleware such as MQ™ from IBM Corp., or data files/records such as Virtual Storage Access Method (VSAM) data sets from IBM Corp. It should be appreciated that other types of data sources can be contemplated as within the scope of technology described herein. As mentioned previously, many organizations are migrating application data stored in source databases 103*a*-103*n* from such on-premises environments 103 to modern cloud computing infrastructures like cloud computing environment 110.

Communications network 104 enables the components of system 100 to communicate with each other for the purpose of automated replication and reconciliation of source data from an on-premises database into a cloud database as described herein. Network 104 is typically comprised of one or more wide area networks, such as the Internet and/or a cellular network, and/or local area networks. In some embodiments, network 104 is comprised of several discrete networks and/or sub-networks (e.g., cellular to Internet).

Transaction message platform 105 comprises one or more computing devices (which can be physical devices such as servers; logical devices such as containers, virtual machines, or other cloud computing resources; and/or a combination of both) that enable the exchange of messages using a streaming architecture. In some embodiments, the messages relate to the replication of data from one or more source databases 103*a*-103*n* in on-premises computing environment 103 to one or more target databases 110*a*-110*n* in cloud computing environment 110. For example, transaction message platform 105 can be configured with one or more message queues or clusters that receive messages corresponding to data replication from one of the source databases 103*a*. In some embodiments, each message queue can be considered as a data replication pipeline for a different application workflow. Platform 105 can make these message clusters available for consumption by, e.g., message capture module 108*a* of server computing device 106 as will be described below. In some embodiments, transaction message platform 105 is configured as an event streaming platform—such as Apache Kafka® available from Apache Software Foundation. In this paradigm, source databases 103*a*-103*n* act as 'producers' and message capture module 108*a* acts as a 'consumer' with respect to the messages of transaction message platform 105. As a producer, source databases 103*a*-103*n* publish events corresponding to data replication processes (e.g., initiated by client computing device 102) to transaction message platform 105, which assigns the events to message topics. Message capture module 108*a* can subscribe to one or more topics in platform 105 and when module 108*a* detects activity for the subscribed topics/events in platform 105, module 108*a* receives and processes the subscribed events. Generally, topics are used to organize and store messages; for example, messages can be sent by producers to a given topic and transaction message platform 105 appends the messages one after another to create a log file. Consumers can pull messages from a specific topic for processing. In some embodiments, each message comprises a key, a value, a compression type, a timestamp, a partition number and offset ID, and one or more optional metadata headers. Generally, the key can be a string, a number, or any object, and the value represents the content of the message. The partition number and offset ID are assigned when the message is sent to a topic. The combination of topic, partition number, and offset ID serves as a unique identifier for the message. In some embodiments, the functionality of transaction message platform 105 can be integrated into server computing device 106 and/or cloud computing environment 110. In some embodiments, transaction message platform 105 is configured as a standalone computing device.

Server computing device 106 is a device including specialized hardware and/or software modules that execute on one or more processors and interact with memory modules of server computing device 106, to receive data from other components of system 100, transmit data to other components of system 100, and perform functions for automated replication and reconciliation of source data from an on-premises database into a cloud database as described herein. As mentioned above, server computing device 106 includes message capture module 108*a*, data replication module 108*b*, replication health module 108*c*, and data reconciliation module 108*d*. In some embodiments, modules 108*a*-108*d* are specialized sets of computer software instructions programmed onto one or more dedicated processors in server computing device 106.

Although modules 108*a*-108*d* are shown in FIG. 1 as executing on server computing device 106, in some embodiments the functionality of modules 108*a*-108*d* can be distributed among a plurality of server computing devices. As shown in FIG. 1, server computing device 106 enables modules 108*a*-108*d* to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the technology. In some embodiments, server computing device 106 can be hosted in cloud computing environment 110, or server computing device 106 can be located on a separate computing device that is external to cloud computing environment 110. The exemplary functionality of modules 108*a*-108*d* is described in detail throughout the specification.

Cloud computing environment 110 is a combination of hardware, including one or more special-purpose processors and one or more physical memory modules, and specialized software—such as target databases 110*a*-110*n*, software applications 112*a*-112*n*, operations database 114 *a*, and data access module 114*b*—that are executed by processor(s) of one or more server computing devices in cloud computing environment 110, to receive data from other components of system 100, transmit data to other components of system 100, and perform functions for automated replication and reconciliation of source data from an on-premises database into a cloud database as described herein. In some embodiments, one or more elements 110*a*-110*n*, 112*a*-112*n*, and/or 114*a*-114*b* of cloud computing environment 110 comprise virtual computing resources, e.g., software modules such as a container that includes a plurality of files and configuration information (i.e., software code, environment variables, libraries, other dependencies, and the like) and one or more database instances (i.e., data files and/or a local database). Cloud computing environment 110 can be configured to execute many instances of these elements in isolation from each other that access a single operating system (OS) kernel. In some embodiments, cloud computing environment 110 executes each virtual resource 110*a*-110*n*, 112*a*-112*n*, and 114*a*-114*b* in a separate OS process, and constrains each virtual resource's access to physical resources (e.g., CPU, memory) of the corresponding server computing device so that a single virtual resource does not utilize all of the available physical resources. In one embodiment, cloud computing environment 110 is deployed using a commercially available cloud computing platform—including but not limited to: Amazon® AWS™, Microsoft® Azure™, IBM® Cloud and/or Google® Cloud.

In some embodiments, computing resources of cloud computing environment 110 can be distributed into a plurality of regions which can be defined according to certain geographic and/or technical performance requirements. Each region can comprise one or more datacenters connected via a regional network that meets specific low-latency requirements. Inside each region, cloud computing environment 110 can be partitioned into one or more availability zones (AZ), which are physically separate locations used to achieve tolerance to, e.g., hardware failures, software failures, disruption in connectivity, unexpected events/disasters, and the like. Typically, the availability zones are connected using a high-performance network (e.g., round trip latency of less than two milliseconds). It should be appreciated that other types of computing resource distribution and configuration in a cloud environment can be used within the scope of the technology described herein.

Target databases 110*a*-110*n* reside in cloud computing environment 110 and enable an organization to store, access, and share enterprise data for a multitude of end user software applications 112*a*-112*n*. Exemplary target databases 110*a*-110*n* include, but are not limited to, NoSQL data stores that use the DynamoDB® infrastructure, relational databases such as PostgreSQL™, and data analysis platforms such as Amazon® Redshift™ available from Amazon, Inc.; Microsoft® Azure™ available from Microsoft Corp.; Oracle® Cloud Infrastructure™ (OCI) available from Oracle Corp.; Google® BigQuery™ available from Google, Inc.; and Snowflake™ Data Cloud available from Snowflake, Inc.

Software applications 112*a*-112*n* generally comprise applications or application workflows that are accessed by end users and/or other computing systems (e.g., via application programming interfaces (APIs)) and that utilize enterprise data stored in one or more target databases 110*a*-110*n*. For example, an enterprise may configure software applications 112*a*-112*n* to perform a range of different data processing functions and/or transactions that are essential to operation of the enterprise. Software applications 112*a*-112*n* can include both customer-facing applications and internal applications. As just one example, a financial services organization may configure a software application 112*a* to execute a workflow for stopping payment on a check. When initiated by a customer and/or by an internal process, the stop payment workflow application can execute one or more functions on data stored in target databases 110*a*-110*n* (and/or on data stored in source databases 103*a*-103*n*) to perform the stop payment transaction processing.

Operations database 114*a* and data access module 114*b* are resources of cloud computing environment 110 that enable the monitoring of data replication processes performed by system 100 as well as managing access to replicated data stored in target databases 110*a*-110*n*. In some embodiments, operations database 114*a* is coupled to replication health module 108*c* for receipt and storage of replication status indicia and health metrics from module 108*c*. Data access module 114*b* is configured to analyze the replication status indicia and health metrics stored in operations database 114*a* to, e.g., determine whether software applications 112*a*-112*n* can access the replicated data stored in target databases 110*a*-110*n*. Additional detail about the functionality of operations database 114*a* and data access module 114*b* will be provided below.

As described previously, many organizations are migrating enterprise data to the cloud that is currently stored in disparate computing systems (e.g., legacy mainframes), architectures, software platforms, and geographic locations across the organization—in order to take advantage of the scalability, flexibility, security, collaboration features, and ease of use offered by cloud-based databases and infrastructures. However, this process requires significant time and resource investment from developers and system administrators to prepare the required data models and migration scripts for storage of the enterprise data in the cloud-based data analytics platform. In addition, certain on-premises or legacy data stores may not be readily compatible with the data model requirements imposed by cloud databases. In view of these challenges, the methods and systems described herein provide an improved process for seamlessly replicating source data from on-premises computing systems into target cloud-based databases and platforms using metadata and schema information provided from the respective source databases. The methods and systems described herein also beneficially reconcile data that has been replicated to the cloud to ensure data accuracy and consistency resulting from the replication process.

Figure 2:
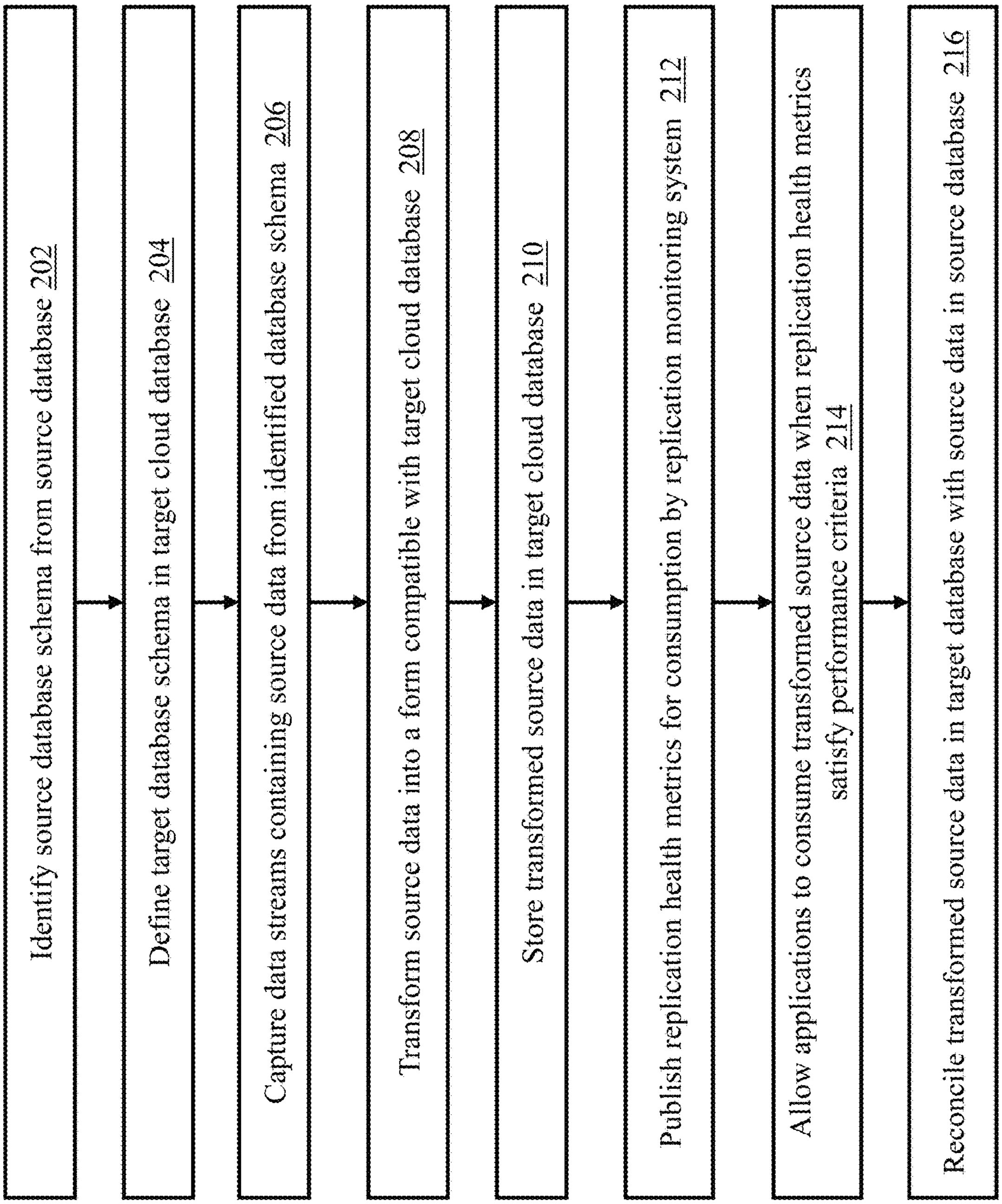
FIG. 2 is a flow diagram of a computerized method of automated replication and reconciliation of source data from an on-premises database into a cloud database.

FIG. 2 is a flow diagram of a computerized method 200 of automated replication and reconciliation of source data from an on-premises database (e.g., source databases 103*a*-103*n*) into a cloud database (e.g., target databases 110*a*-110*n*), using system 100 of FIG. 1. In some embodiments, server computing device 106 is accessible by software installed at client computing device 102 to enable client computing device 102 to connect to server computing device 106 (e.g., via an HTTP session in a browser), provide commands for the replication of data from one or more database tables in source databases 103*a*-103*n* to corresponding data structures in one or more of target databases 110*a*-110*n*, and receive and view UI screens associated with the status and progress of data replication in cloud computing environment 110.

Upon logging into server computing device 106, a user at client computing device 102 can interact with data replication module 108*b* of server computing device 106 to identify (step 202) source database schema in one or more source databases 103*a*-103*n* from on-premises environment 103 for replication to corresponding data structure(s) in target databases 110*a*-110*n* of cloud computing environment 110. For example, the user at client computing device 102 can interact with one or more user interface elements to identify a software application and/or workflow (e.g., stop check payment) applicable to on-premises computing environment 103 that comprises data for replication to cloud computing environment 110. Upon receiving the identification of the software application from client computing device 102, data replication module 108*b* can determine a source database schema (e.g., one or more data structures such as tables/columns and related metadata) from source database(s) 103*a*-103*n* that corresponds to the identified software application. In some embodiments, data replication module 108*b* is configured with a mapping table or other data structure that associates software applications with applicable database schema in source databases 103*a*-103*n*. Data replication module 108*b* captures the source database schema and determines one or more data streams (e.g., based upon clusters and/or topics) in transaction message platform 105 that correspond to the source database schema. For example, data replication module 108*b* can determine that the software application workflow identified by the user of client computing device 102 is assigned to one or more data streams of transaction message platform 105 which produce messages containing the replicated data from source databases 103*a*-103*b* for that application workflow. Data replication module 108*b* can instruct message capture module 108*a* to subscribe to the specific data streams for the application workflow as part of the replication process, so that when data is pushed from the source databases 103*a*-103*n*, message capture module 108*a* receives the event messages with the source data for processing.

Data replication module 108*b* defines (step 204) target database schema in one or more target cloud databases 110*a*-110*n* in which the replicated data from source databases 103*a*-103*n* will be stored. The target database schema comprises one or more data structures in the target cloud database(s) 110*a*-110*n* that correspond to the data structures in the source database schema. It should be appreciated that, in some embodiments, there does not need to be a one-to-one correspondence between data structures in the source database schema and data structures in the target database schema. As will be described in greater detail below, data replication module 108*b* transforms source data received from on-premises environment 103 into a form compatible with the target database schema, instead of simply copying the source data as-is into target data structures.

Figure 3:
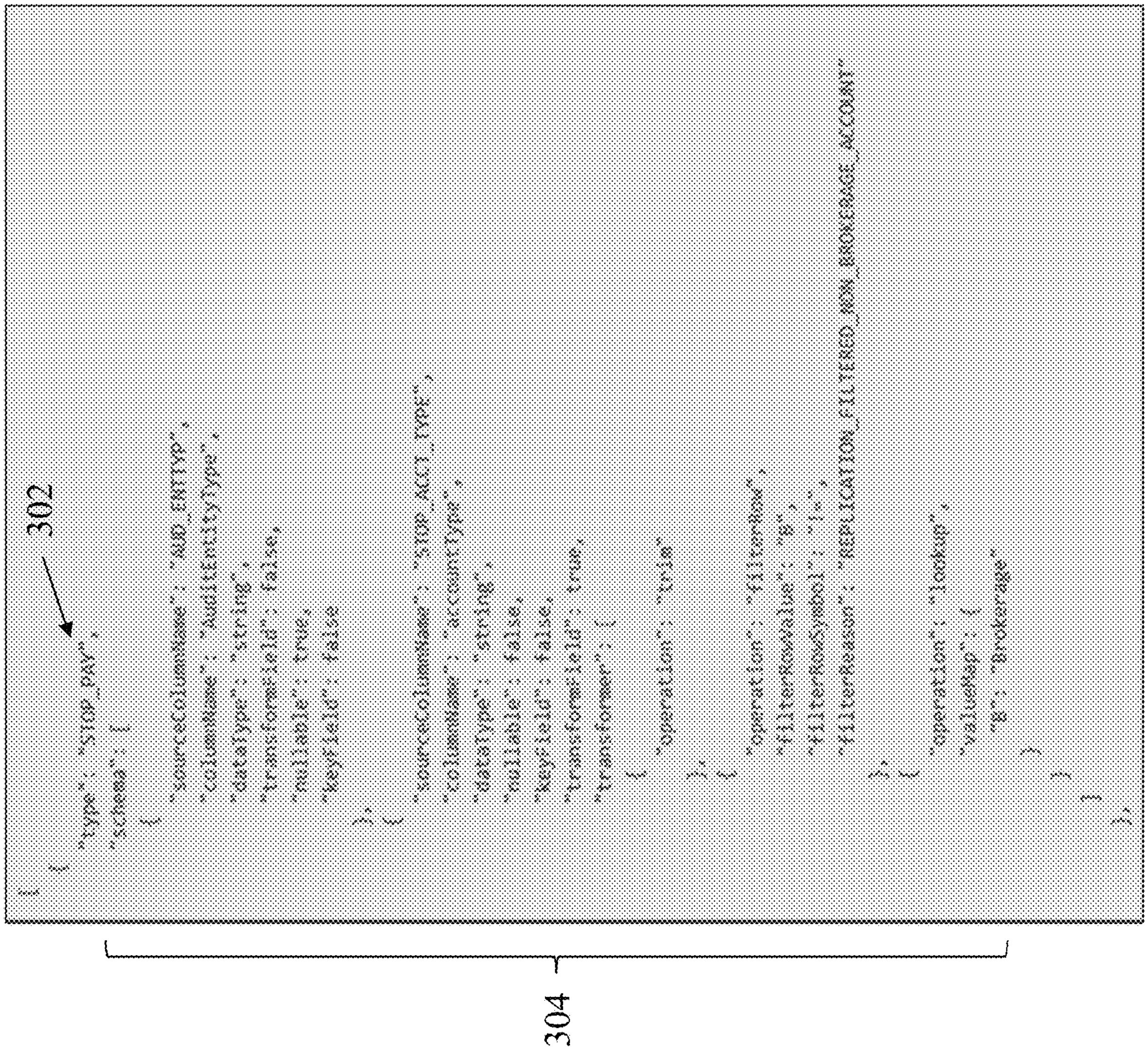
FIG. 3 is a diagram of an excerpt of an exemplary source database schema.
Figure 4:
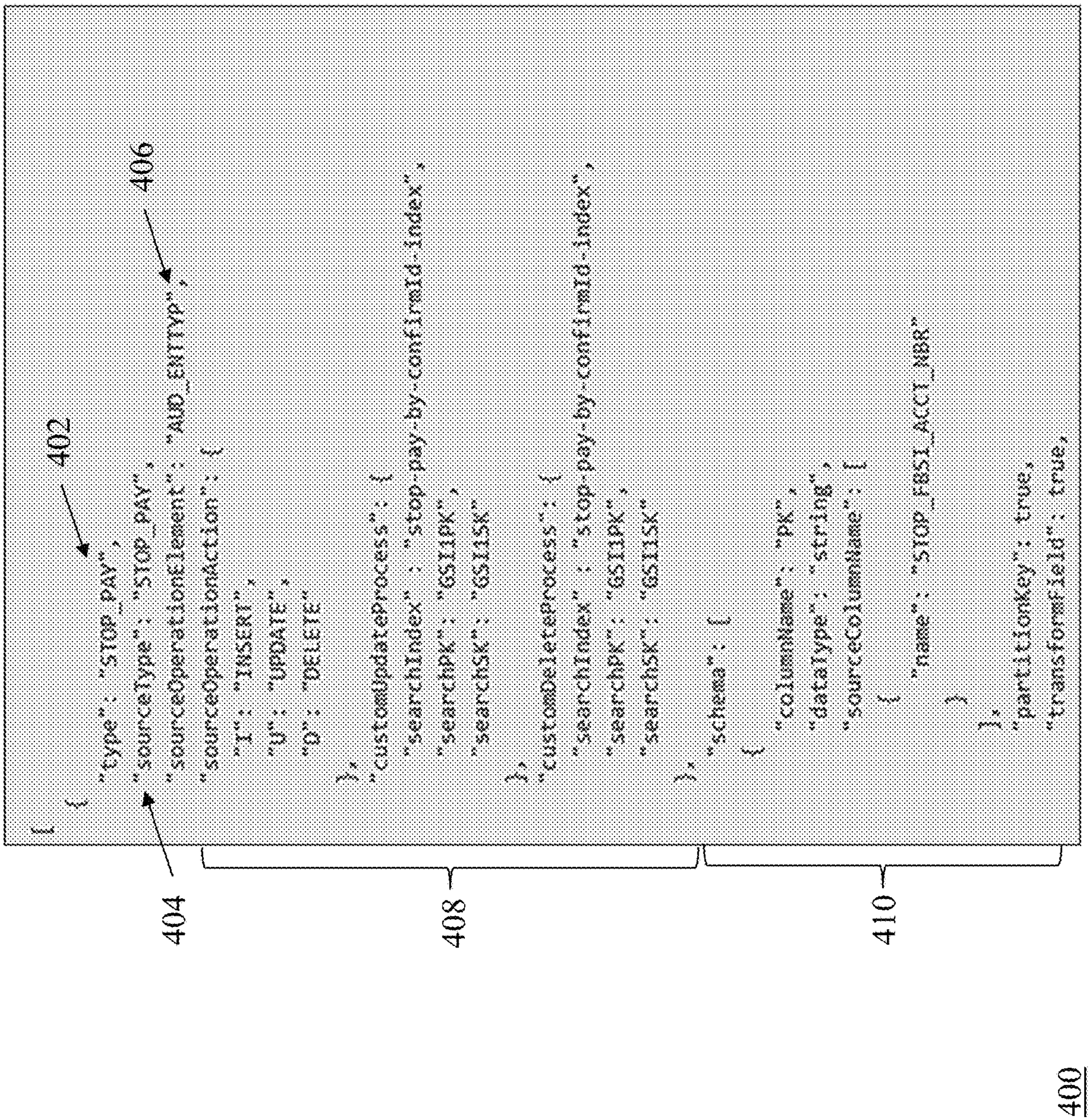
FIG. 4 is a diagram of an excerpt of an exemplary target database schema.

FIG. 3 is a diagram of an excerpt of an exemplary source database schema 300. As shown in FIG. 3, the source database schema 300 identifies an application workflow type (STOP_PAY) 302 and data structures/metadata 304 that make up the schema—e.g., column names, data types, transform fields, filters, other operations, etc. FIG. 4 is a diagram of an excerpt of an exemplary target database schema 400. As shown in FIG. 4, the target database schema 400 has the same application workflow type (STOP_PAY) 402 as the source schema and also identifies the source application workflow type 404. The schema 400 also includes identification of the source database structure (AUD_ENTTYP column) 406 from which the data is being replicated, as well as operations 408 to be performed as part of the replication based on the operation type (e.g., Insert, Update, Delete), and the target data structures 410 into which the source data is stored.

Once data replication module 108*b* has configured the source database schema and target database schema as described above, data can be replicated from source databases 103*a*-103*n* to target databases 110*a*-110*n*. Message capture module 108*a* of server computing device 106 captures (206) one or more data streams from transaction message platform 105 that comprise messages containing the source data from the identified source database schema. As mentioned above, module 108*a* has subscribed to one or more streams/topics in transaction message platform 105 that correspond to the application workflow. In some embodiments, when data changes occur in source databases 103*a*-103*n* that relate to the application data being replicated, a change data capture (CDC) process in on-premises environment 103 is configured to generate and produce event messages on one or more data streams in platform 105. These event messages can comprise the changed data along with identification of the application workflow (STOP_PAY) and/or source database schema. Message capture module 108*a* consumes the messages from transaction message platform 105 and provides the consumed messages to data replication module 108*b* for processing.

In some embodiments, the event messages produced by the CDC process and/or the transaction message platform 105 for consumption by module 108*a* also include a configuration data structure that defines, e.g., certain thresholds or metrics for the specific data replication process. FIG. 5 is a diagram of an excerpt of exemplary configuration data 500 for a data replication process. As shown in FIG. 5, the configuration data 500 includes one or more thresholds 502 (e.g., latency thresholds) for specific replication time windows. In some embodiments, the latency thresholds apply to the data replication from source databases 103*a*-103*n* to target databases 110*a*-110*n* and can be used by replication health module 108*c* to determine whether the replication process is operating correctly or whether there are errors or issues that may be causing undesirable delay in data replication. For example, if the amount of time it takes for the replication process to consume source data, transform the source data into a form compatible with the target databases, and store the transformed data into the target databases exceeds the defined latency threshold, replication health module 108*c* can generate a notification including one or more replication health metrics for storage in operations database 114*a*. Additional detail about the use of latency thresholds in determining the health of a replication process is provided later in the specification.

Turning back to FIG. 2, data replication messages are consumed by message capture module 108*a* and transmitted to data replication module 108*b* for processing. Data replication module 108*b* transforms (step 208) the source data contained in the messages into a form compatible with the target cloud databases 110*a*-110*n*. In some embodiments, data transformation includes converting a data type of one or more data elements in the source data to match a target data type acceptable by the target cloud databases 103*a*-103*n*. As can be appreciated, target databases 110*a*-110*n* may have different naming conventions, data type requirements, or other data configuration and storage parameters than the source databases 103*a*-103*n*. As an example, the source databases 103*a*-103*n* may store string values using a VARCHAR data type without a defined maximum length, while the target databases 110*a*-110*n* may require string data to have a maximum length. In this example, data replication module 108*b* can transform the source data that has a VARCHAR data type into target data that has VARCHAR(x) data types, where x denotes a specific character length. In some embodiments, data replication module 108*b* can be configured to utilize a mapping table when performing such conversions, where the mapping table associates source data types/values etc. found in source databases 103*a*-103*n* to data types/values acceptable to target databases 110*a*-110*n*.

In some embodiments, data replication module 108*b* is configured to validate the transformed source data prior to storage in the target cloud databases 110*a*-110*n*. For example, module 108*b* can analyze the target database schema associated with the data replication process to identify, e.g., specific data types, data flags, or other requirements imposed by the target schema. Then, module 108_b_ can confirm that the transformations applied to the source data align with the target database requirements (e.g., by comparing the transformed data to the target schema requirements to identify errors or issues). In the event that any transformed data cannot be validated, data replication module 108_b_ can transmit a notification to replication health module 108_c_ for publication of corresponding health metrics to operations database 114_a_ and/or another computing device (such as client computing device 102) for remediation.

Also, in some embodiments, message capture module 108_a_ and data replication module 108_b_ can perform message consumption and data transformation processes for a plurality of different data replication workflows in parallel. For example, changes to source data can occur for multiple different software application workflows concurrently in on-premises environment 103. As a result, these data changes are pushed as they occur to different message topics/streams in transaction message platform 105. Message capture module 108_a_ can subscribe to each of these message streams and thus consume messages from multiple streams at the same time for processing by data replication module 108_b_. Data replication module 108_b_ can be configured to process the messages in parallel to effect data replication from source to target for multiple different application workflows at the same time. Once data replication module 108_b_ has transformed and validated the source data according to the target database schema, module 108_b_ stores (step 210) the transformed source data in one or more target databases 110_a_-110_n_ in cloud computing environment 110.

An important aspect of the present methods and systems is the ability for server computing device 106 to monitor the health of data replication processes and to publish performance metrics associated with the data replication processes to, e.g., operations database 114_a_. As can be appreciated, accuracy and completeness of enterprise data that is being replicated from source databases 103_a_-103_n_ to target databases 110_a_-110_n_ may be essential for uninterrupted operation of the enterprise's business software applications. In the event that data is not replicated from source to target in a timely fashion and/or the replicated data is inaccurate, incomplete, or missing, it can have substantial impacts on the integrity of the organization's computing systems and the organization's ability to carry out its mission-critical functions—from data processing to transaction execution. Replication health module 108_c_ advantageously captures real-time replication health status and metrics and publishes (step 212) the data to operations database 114_a_ for use in dynamically adjusting the ability for downstream applications (e.g., applications 112_a_-112_n_) to access replicated data in cloud environment 110, as well as generating reports and notifications to end users such as technical personnel regarding anomalies or issues that occur during a replication process.

In some embodiments, the health metrics captured by replication health module 108_c_ include one or more of a replication latency, a replication data error count, and a replication connection error count. For example, module 108_c_ can be configured to measure an amount of time (also called latency) between (i) a data change occurring in a source database 103_a_-103_n_ and (ii) the corresponding transformed data being stored in a target database 110_a_-110_n_. In some embodiments, module 108_c_ can capture a first timestamp associated with the source data to a second timestamp associated with storage of the data in the target database to determine the latency. For example, when the CDC process in on-premises environment 103 detects a data change in source databases 103_a_-103_n_, the CDC process can generate a message for production to transaction message platform 105 that includes a timestamp of when the change was detected. Similarly, when data replication module 108_b_ writes the transformed source data to one or more target databases 110_a_-110_n_, module 108_b_ can include a timestamp with the data records that indicates when the data was written. Replication health module 108_c_ can compare these timestamps to determine the latency. As can be appreciated, certain types of data may become unreliable or 'stale' as time passes—for example, real-time transaction data is updated frequently. If a replication process involving this real-time data is outside of an acceptable latency threshold, applications 112_a_-112_n_ may not have access to the most current data from target databases 110_a_-110_n_ which can cause errors or data integrity issues for the corresponding application functionality. To prevent this from happening, replication health module 108_c_ can identify when a replication latency is outside of a maximum defined threshold, record the latency issue in operations database 114_a_, and transmit a notification message to one or more remote computing devices (e.g., client device 102) to inform personnel of the latency issue.

In some embodiments, data replication module 108_b_ may encounter errors or issues during the data transformation, validation, and storage processes described above. For example, module 108_b_ can determine that certain data elements are unable to be transformed or validated for storage in target databases 110_a_-110_n_. Replication health module 108_c_ can capture these errors and record corresponding health metrics (e.g., a replication error count) and logs in operations database 114_a_.

In some embodiments, server computing device 106 may encounter problems establishing a connection to on-premises computing environment 103, transaction message platform 105, and/or cloud computing environment 110. For example, network instability, computing hardware failure, or other technical issues can occur that prevent server computing device 106 from connecting to databases or other resources to perform its functions. Replication health module 108_c_ can detect these connection failures and record corresponding health metrics (e.g., a replication connection error count) and logs in operations database 114_a_.

Users at remote computing devices can access the health metrics/logs to generate reports that detail the status of certain data replication processes. In some embodiments, operations database 114_a_ can be integrated with one or more external data analysis tools, such as observability services or analytics platforms (e.g., Datadog™ available from Datadog, Inc.; Splunk™ available from Cisco Systems, Inc.). In some embodiments, operations database 114_a_ is integrated with an incident ticket management platform to automatically generate incident tickets for remediation based upon the replication health metrics.

In addition to the above, system 100 is configured to manage access to data stored in target databases 110_a_-110_n_ based upon analysis of the replication health metrics. In some embodiments, data access module 114_b_ of cloud computing environment 110 is configured to analyze replication health metrics stored in operations database 114_a_ and allow (step 214) one or more applications 112_a_-112_n_ in cloud computing environment to consume the transformed source data from the target cloud databases 110_a_-110_n_ when the replication health metrics from database 114_a_ satisfy one or more performance criteria. As mentioned previously, the latency associated with a particular replication process may be important in determining whether the replicated data in target databases 110*a*-110*n* is reliable or not. Data access module 114*b* can use the health metrics from operations database 114*a* to identify whether a latency associated with a replication process exceeds a maximum defined latency threshold. If the maximum latency is exceeded, data access module 114*b* can restrict access to corresponding target databases 110*a*-110*n*, and/or specific data structures within the databases 110*a*-110*n*, so that applications 112*a*-112*n* are not able to perform certain actions (e.g., read, copy) on the target data. For example, data access module 114*b* can adjust a setting in target databases 110*a*-110*n* to block applications 112*a*-112*n* from accessing the data. In another example, data access module 114*b* can re-route data access requests received from applications 112*a*-112*n* to one or more source databases 103*a*-103*n* in the on-premises computing environment 103 to ensure continued operation of the applications 112*a*-112*n* using the most current source data. In this example, when the replication latency falls below the maximum latency threshold, data access module 114*a* can enable applications 112*a*-112*n* to resume access to the requested data from target databases 110*a*-110*n*.

Along with the improvements to data replication described above, the systems and methods of the present application also provide a data reconciliation procedure that periodically verifies that data replicated between source databases 103*a*-103*n* and target databases 110*a*-110*n* is accurate. Data reconciliation module 108*d* is configured to reconcile (step 216) transformed source data in target databases 110*a*-110*n* with source data in source databases 103*a*-103*n*.

Figure 6:
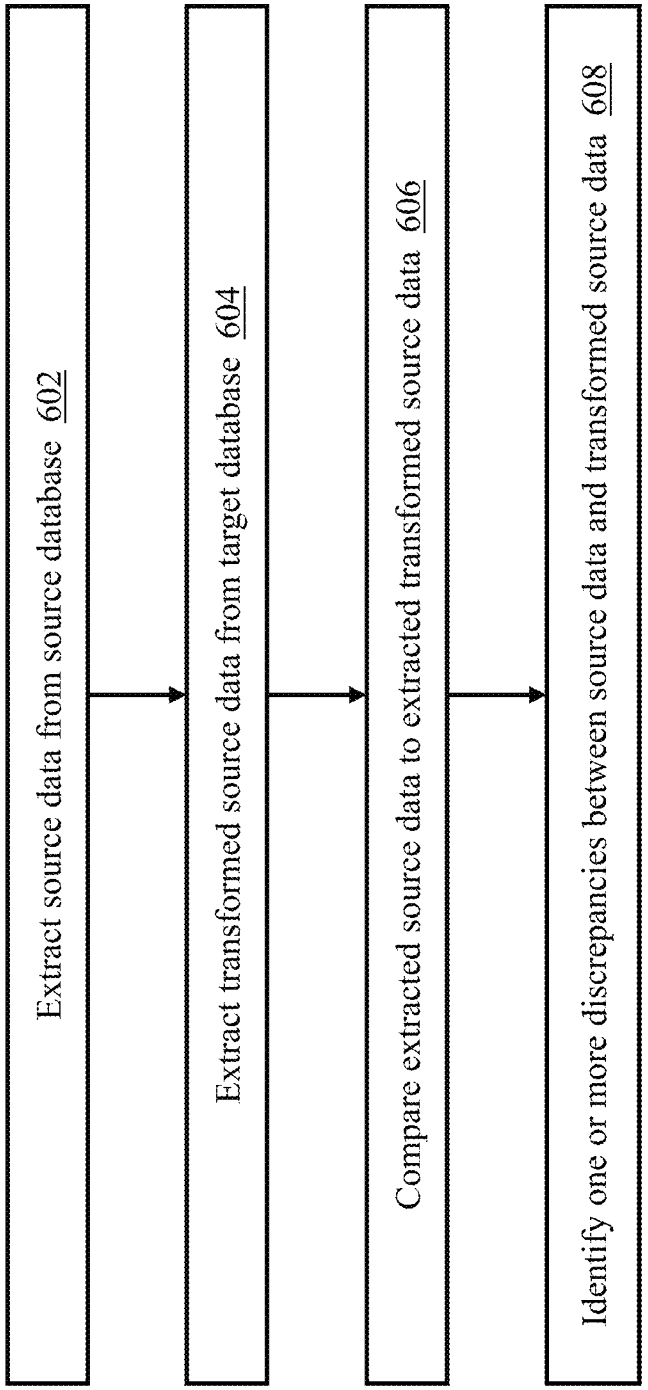
FIG. 6 is a diagram of a computerized method of automated reconciliation of source data between an on-premises database and a cloud database.

FIG. 6 is a diagram of a computerized method 600 of automated reconciliation of source data between an on-premises database (e.g., databases 103*a*-103*n*) and a cloud database (e.g., databases 110*a*-110*n*), using system 100 of FIG. 1. Data reconciliation module 108*d* of server computing device 106 initiates the data reconciliation procedure by extracting (step 602) source data from one or more source databases 103*a*-103*n*. In some embodiments, data reconciliation module 108*d* selects a configured data replication pipeline and extracts source data from one or more source databases 103*a*-103*n* for use in the reconciliation. In some embodiments, module 108*d* copies at least a portion of the source data into a data storage container (e.g., AWS™ S3 bucket) in cloud computing environment 110. The copied source data can comprise snapshot data (or point-in-time data) for a specific database state or time. Module 108*d* preprocesses the extracted source data to, e.g., identify the source database schema, retrieve configuration data, and identify the target data structures (e.g., table names) in databases 110*a*-110*n* where the transformed source data is stored. In some embodiments, module 108*d* can determine the above information based upon the selection of the data replication pipeline.

Then, data reconciliation module 108*d* extracts (step 604) transformed source data from target databases 110*a*-110*n* that corresponds to the extracted source data. In some embodiments, module 108*d* requests a point-in-time export from target databases 110*a*-110*n* of a portion of transformed source data that aligns with the same point in time as the extracted source data. Module 108*d* can store the extracted transformed source data from target databases 110*a*-110*n* in the data storage container where the extracted source data from source databases 103*a*-103*n* is located.

Data reconciliation module 108*d* compares (step 606) the extracted source data to the extracted transformed source data in the data storage container to identify one or more discrepancies. In some embodiments, module 108*d* is configured to determine that one or more data elements in the source data are missing in the transformed source data. For example, during a data replication process, data replication module 108*b* may have been unable to transform and store a particular source data record in the target database 110*a*-110*n*. Data reconciliation module 108*d* can detect this discrepancy by determining that a source data record does not have a corresponding transformed source data record in target database 110*a*-110*n*. In some embodiments, module 108*d* is configured to determine that one or more data elements in the transformed source data are missing in the source data. For example, an error may have occurred during data replication that resulted in invalid or incorrect data being stored in target databases 110*a*-110*n* that does not have a corresponding record in source databases 103*a*-103*n*. In some embodiments, data reconciliation module 108*d* is configured to determine that one or more data elements in the source data do not match the corresponding data elements in the transformed source data. For example, data replication module 108*b* may have incorrectly transformed a data element (e.g., used the wrong data type, truncated the data element, etc.) when storing the data element in target databases 110*a*-110*n*. Data reconciliation module 108*d* can detect this discrepancy by comparing the data elements and identify a difference between them.

Upon detecting one or more discrepancies, data reconciliation module 108*d* can perform several different tasks—including notifying relevant technical personnel and executing data correction processes to self-heal the target databases 110*a*-110*n*. In some embodiments, module 108*d* can transmit a notification message to a remote computing system (e.g., client computing device 102) upon identifying one or more discrepancies. The notification message can include information about the discrepancies, such as table names, discrepancy counts, discrepancy types, erroneous data elements, and so forth. In some embodiments, the discrepancy information can be stored in operations database 114*a*.

In some embodiments, module 108*d* can update one or more data elements in the source data to correct the one or more discrepancies. For example, module 108*d* can generate one or more scripts or load files that contain operations for correcting the discrepancies in the source databases 103*a*-103*n*. The operations can comprise insert, update, and/or delete commands that are executed against source databases 103*a*-103*n* to synchronize the source data to the transformed source data analyzed by module 108*d*.

Similarly, in some embodiments, module 108*d* can update one or more data elements in the transformed source data to correct the one or more discrepancies. For example, module 108*d* can generate one or more scripts or load files that contain operations for correcting the discrepancies in the target databases 110*a*-110*n*. The operations can comprise insert, update, and/or delete commands that are executed against target databases 110*a*-110*n* to synchronize the source data to the transformed source data analyzed by module 108*d*.

As can be appreciated, the methods and systems of the present application provide several substantial technical benefits over existing data replication computing systems including:

- support for CDC based data replication from legacy mainframe databases (e.g., DB2) to cloud based databases (e.g., DynamoDB) while being able to handle complex data transformations;

pre-build and configuration of data replication pipelines to package each consumer/pipeline independently for deployment;

include real-time Replication Pipeline health and latency monitoring with status accessible via REST API and dashboards;

pre-built observability and monitoring dashboards with real-time alerting through incident tickets and email notification;

high availability and resiliency through multi-region cloud deployment and smart self-healing feature with near point in time recovery;

provision of multiple independent replication pipes (CDC & Kafka infrastructure) bringing data from legacy databases to the messaging infrastructure in parallel, so that each consumer/pipeline can independently choose/toggle between upstream pipes; and independent runtime for each consumer/pipeline isolates the pipes from each other during failures (thus eliminating a noisy neighbor effect).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account—which allows access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application, and store relevant data.

Method steps can be performed by one or more processors executing a computer program to perform functions of the technology by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN),), a private IP network, an IP private branch exchange (IPBX), a wireless network (e.g., radio access network (RAN), Bluetooth™, near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting the subject matter described herein.

What is claimed is:

1. A system for automated replication and reconciliation of source data from an on-premises database into a cloud database, the system comprising a server computing device having a memory for storing computer-executable instructions and a processor that executes the computer-executable instructions to:

identify a source database schema from a source database in an on-premises computing environment for replication to a target cloud database in a cloud computing environment, the source database schema comprising one or more data structures containing source data;

define a target database schema comprising one or more data structures in the target cloud database that correspond to the data structures in the source database schema, including generating connection parameters for the target cloud database when defining the target database schema;

capture, from a transaction message platform, one or more data streams comprising messages containing the source data from the identified source database schema;

transform the source data from the data stream messages into a form compatible with the target cloud database;

store the transformed source data in one or more data structures in the target cloud database;

publish one or more replication health metrics for consumption by a replication monitoring system;

allow one or more applications in the cloud computing environment to consume the transformed source data from the target cloud database when the replication health metrics satisfy one or more performance criteria; and reconcile the transformed source data in the target cloud database with the source data in the source database.

2. The system of claim 1, wherein the source database is hosted by a mainframe computing system in the on-premises computing environment.

3. The system of claim 1, wherein each of the one or more data streams in the transaction message platform is associated with source data for a different application workflow.

4. The system of claim 3, wherein the server computing device captures messages from a plurality of the data streams in parallel.

5. The system of claim 1, wherein transforming the source data from the data stream messages into a form compatible with the target cloud database comprises converting a data type of one or more data elements in the source data to match a target data type acceptable by the target cloud database.

6. The system of claim 5, wherein the server computing device validates the transformed source data prior to storage in the target cloud database.

7. The system of claim 1, wherein the replication health metrics include one or more of a replication latency, a replication data error count, and a replication connection error count.

8. The system of claim 7, wherein the server computing device determines the replication latency by comparing a timestamp associated with the source data from the source database to a timestamp associated with corresponding transformed source data stored in the cloud database.

9. The system of claim 7, wherein the server computing device prevents one or more applications in the cloud computing environment from consuming the transformed source data from the target cloud database when the replication latency is greater than a maximum latency threshold.

10. The system of claim 1, wherein reconciling the transformed source data in the target cloud database with the source data in the source database comprises:

extracting one or more data elements from the source data;

extracting one or more data elements from the transformed source data that correspond to the data elements from the source data; and comparing the extracted data elements from the source data to the extracted data elements from the transformed source data to identify one or more discrepancies including: (i) one or more data elements in the source data that are missing in the transformed source data; (ii) one or more data elements in the transformed source data that are missing in the source data; and (iii) one or more data elements in the source data that do not match the corresponding data elements in the transformed source data.

11. The system of claim 10, wherein the server computing device transmits a notification message to a remote computing system upon identifying one or more discrepancies.

12. The system of claim 10, wherein the server computing device updates one or more data elements in the source data to correct the one or more discrepancies.

13. The system of claim 10, wherein the server computing device updates one or more data elements in the transformed source data to correct the one or more discrepancies.

14. A computerized method of automated replication and reconciliation of source data from an on-premises database into a cloud database, the method comprising:

identifying, by a server computing device, a source database schema from a source database in an on-premises computing environment for replication to a target cloud database in a cloud computing environment, the source database schema comprising one or more data structures containing source data;

defining, by the server computing device, a target database schema comprising one or more data structures in the target cloud database that correspond to the data structures in the source database schema, including generating connection parameters for the target cloud database when defining the target database schema;

capturing, by the server computing device from a transaction message platform, one or more data streams comprising messages containing the source data from the identified source database schema;

transforming, by the server computing device, the source data from the data stream messages into a form compatible with the target cloud database;

storing, by the server computing device, the transformed source data in one or more data structures in the target cloud database;

publishing, by the server computing device, one or more replication health metrics for consumption by a replication monitoring system;

allowing, by the server computing device, one or more applications in the cloud computing environment to consume the transformed source data from the target cloud database when the replication health metrics satisfy one or more performance criteria; and reconciling by the server computing device, the transformed source data in the target cloud database with the source data in the source database.

15. The method of claim 14, wherein the source database is hosted by a mainframe computing system in the on-premises computing environment.

16. The method of claim 14, wherein each of the one or more data streams in the transaction message platform is associated with source data for a different application workflow.

17. The method of claim 16, further comprising capturing, by the server computing device, messages from a plurality of the data streams in parallel.

18. The method of claim 14, wherein transforming the source data from the data stream messages into a form compatible with the target cloud database comprises converting a data type of one or more data elements in the source data to match a target data type acceptable by the target cloud database.

19. The method of claim 18, further comprising validating, by the server computing device, the transformed source data prior to storage in the target cloud database.

20. The method of claim 14, wherein the replication health metrics include one or more of a replication latency, a replication data error count, and a replication connection error count.

21. The method of claim 20, further comprising determining, by the server computing device, the replication latency by comparing a timestamp associated with the source data from the source database to a timestamp associated with corresponding transformed source data stored in the cloud database.

22. The method of claim 20, further comprising preventing, by the server computing device, one or more applications in the cloud computing environment from consuming the transformed source data from the target cloud database when the replication latency is greater than a maximum latency threshold.

23. The method of claim 14, wherein reconciling the transformed source data in the target cloud database with the source data in the source database comprises:

extracting one or more data elements from the source data;

extracting one or more data elements from the transformed source data that correspond to the data elements from the source data; and comparing the extracted data elements from the source data to the extracted data elements from the transformed source data to identify one or more discrepancies including: (i) one or more data elements in the source data that are missing in the transformed source data; (ii) one or more data elements in the transformed source data that are missing in the source data; and (iii) one or more data elements in the source data that do not match the corresponding data elements in the transformed source data.

24. The method of claim 23, further comprising transmitting, by the server computing device, a notification message to a remote computing system upon identifying one or more discrepancies.

25. The method of claim 23, further comprising updating, by the server computing device, one or more data elements in the source data to correct the one or more discrepancies.

26. The method of claim 23, further comprising updating, by the server computing device, one or more data elements in the transformed source data to correct the one or more discrepancies.

* * * * *